(12) United States Patent
Hermann (10) Patent No.: US 8,449,997 B2
(45) Date of Patent: May 28, 2013

(54) THERMAL ENERGY TRANSFER SYSTEM FOR A POWER SOURCE UTILIZING BOTH METAL-AIR AND NON-METAL-AIR BATTERY PACKS

(75) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 410 days.

(21) Appl. No.: 12/951,006

(22) Filed: Nov. 20, 2010

(65) Prior Publication Data

US 2012/0040210 A1    Feb. 16, 2012

Related U.S. Application Data

(60) Provisional application No. 61/372,351, filed on Aug. 10, 2010.

(51) Int. Cl.
*H01M 12/00* (2006.01)
*H01M 10/50* (2006.01)

(52) U.S. Cl.
USPC .................................. 429/9; 429/62; 429/120

(58) Field of Classification Search
USPC ................................. 429/9, 62, 120
See application file for complete search history.

(56) References Cited

U.S. PATENT DOCUMENTS

2007/0212596 A1*   9/2007   Nebrigic et al. ............... 429/61

* cited by examiner

*Primary Examiner* — Carlos Barcena
(74) *Attorney, Agent, or Firm* — Patent Law Office of David G. Beck (57) ABSTRACT

A power source comprised of a metal-air battery pack and a non-metal-air battery pack is provided, wherein thermal energy from the metal-air battery pack is used to heat the non-metal-air battery pack. In one aspect, a thermal energy transfer system is provided that controls the flow of thermal energy from the metal-air battery pack to the non-metal-air battery pack. In another aspect, the flow of thermal energy from the metal-air battery pack to the non-metal-air battery pack is controlled and used to heat the non-metal-air battery pack prior to charging the non-metal-air battery pack.

13 Claims, 5 Drawing Sheets

THERMAL ENERGY TRANSFER SYSTEM FOR A POWER SOURCE UTILIZING BOTH METAL-AIR AND NON-METAL-AIR BATTERY PACKS

CROSS-REFERENCE TO RELATED APPLICATION

This application claims benefit of the filing date of U.S. Provisional Patent Application Ser. No. 61/372,351, filed Aug. 10, 2010, the disclosure of which is incorporated herein by reference for any and all purposes.

FIELD OF THE INVENTION

The present invention relates generally to batteries and, more particularly, to means for maximizing charging efficiencies when utilizing battery packs of differing types.

BACKGROUND OF THE INVENTION

A metal-air cell is a type of electro-chemical battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Due to the use of oxygen as one of the reactants, metal-air cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

While metal-air cells offer a number of advantages over a conventional rechargeable battery, most notably their extremely high energy density, such cells also have a number of drawbacks. For example, care must be taken to avoid undesired electrolyte water loss, especially in high temperature, low humidity environments. More importantly, it is necessary to insure a sufficient supply of air to the cells during discharge cycles, and means for handling the oxygen emitted from the cells during the charge cycles. Another potential disadvantage of a metal-air cell is its discharge rate. Due to the kinetics of the reaction, the maximum discharge rate is far lower than that of many other types of cells, such as lithium-ion cells.

Accordingly, while metal-air cells offer some intriguing benefits, such as its high energy densities, their shortcomings must be taken into account in order to successfully integrate the cells into a system. The present invention provides such a system by combining a metal-air battery pack with a conventional battery pack in order to gain the benefits associated with each battery type.

SUMMARY OF THE INVENTION

The present invention provides a power source comprised of a metal-air battery pack and a non-metal-air battery pack, wherein thermal energy from the metal-air battery pack is used to heat the non-metal-air battery pack.

In at least one embodiment of the invention, a power source is provided that includes a first battery pack comprised of a plurality of metal-air batteries, a second battery pack comprised of a plurality of non-metal-air batteries, and a thermal energy transfer system that transfers thermal energy generated by the first battery pack to the second battery pack in one mode of operation, and reduces (or terminates) the amount of thermal energy transferred from the first battery pack to the second battery pack in a second mode of operation. Exemplary non-metal-air batteries include lithium ion cells, lithium ion polymer cells, nickel metal hydride cells, nickel cadmium cells, nickel hydrogen cells, nickel zinc cells, and silver zinc cells. The thermal energy transfer system may include an air inlet and an air outlet on the first battery pack with at least one valve for controlling air flow out of the air outlet; a coolant loop in thermal communication with the second battery pack; and a heat exchanger in thermal communication with both the coolant loop and an air duct coupled to the air output of the first battery pack, where the at least one valve controls air flow from the outlet through the air duct to the heat exchanger. A refrigeration system may also be thermally coupled to the coolant loop via a second heat exchanger. The power source may further include temperature sensors for monitoring the temperatures of the first and second battery packs and a controller coupled to the thermal energy transfer system, the controller causing the thermal energy transfer system to change between modes of operation based on the temperature of the second battery pack as compared to one or more preset temperatures. The power source may further include a battery charging system. The battery charging system may be configured to charge the first, but not the second, battery pack when the thermal energy transfer system is in a first mode of operation where the first battery pack heats the second battery pack, and charge both battery packs when the thermal energy transfer system is in a second mode of operation where a reduced amount (or no amount) of thermal energy is transferred from the first battery pack to the second battery pack. The battery charging system may be controlled to initiate/suspend charging of the first and second battery packs based on the monitored temperature of one, or both, battery packs. The battery charging system may be controlled to vary the charge rate of the first and second battery packs based on the monitored temperature of one, or both, battery packs. The battery charging system may be controlled to terminate charging of one, or both, battery packs based on the SOC of one, or both, battery packs relative to target SOC levels.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery or battery pack. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
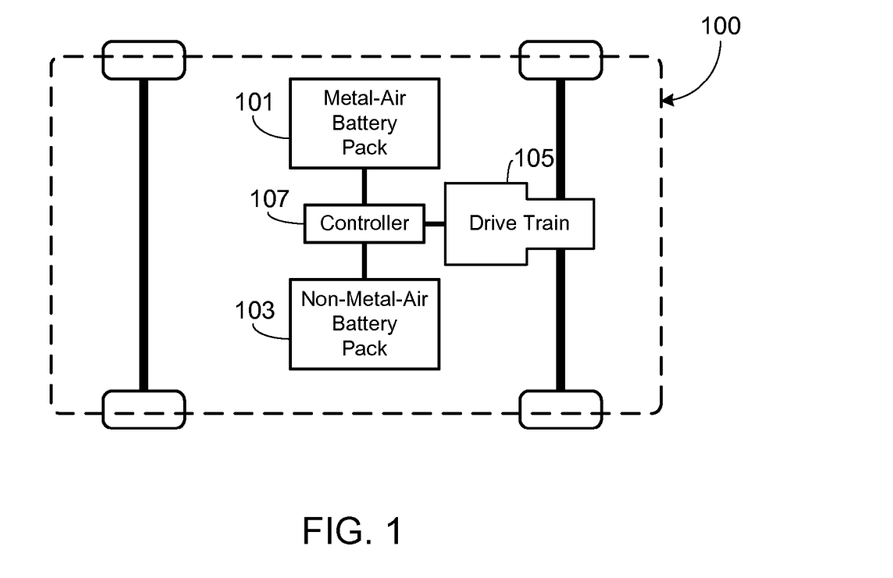
FIG. 1 illustrates the primary components of an electric vehicle that utilizes both a metal-air battery pack and a conventional battery pack.

Given the high energy density and the large capacity-to-weight ratio offered by metal-air cells, they are well suited for use in electric vehicles. Due to their limited power density, however, the present inventor has found their use to be most appropriate when combined with a more conventional power source, such as a lithium ion battery pack. This aspect is illustrated in FIG. 1 which shows the primary components of an EV 100 that utilizes both a metal-air battery pack 101 and a conventional battery pack 103. As used herein, metal-air batteries refer to any cell that utilizes oxygen as one of the electrodes and metal (e.g., zinc, aluminum, magnesium, iron, lithium, vanadium, etc.) in the construction of the other electrode. Conventional battery pack 103 utilizes non-metal-air cells, and preferably ones that provide high power density, thus providing a combined power source that achieves an optimal combination of energy and power. Exemplary batteries used in conventional battery pack 103 include, but are not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, etc. In a preferred application, battery packs 101 and 103 are coupled to one or more drive motors 105 that provide propulsion to one or more wheels of EV 100. A controller 107 is used to achieve an optimal balance between the two battery sources in light of the needs placed on the drive train, for example those placed on the system by the user (e.g., speed, acceleration, etc.), road conditions (e.g., uphill, downhill, etc.), charging system (e.g., available power, available time for charging, etc.), and environmental conditions (e.g., ambient temperature, battery pack temperature, etc.).

One of the advantages of using two different types of battery packs, and more specifically, a metal-air battery pack 101 and a conventional battery pack 103 (e.g., lithium-ion cells) is that the charging requirements for each are quite different. In accordance with the invention, these differences are used to improve the charging efficiency of the overall system.

Figure 2:
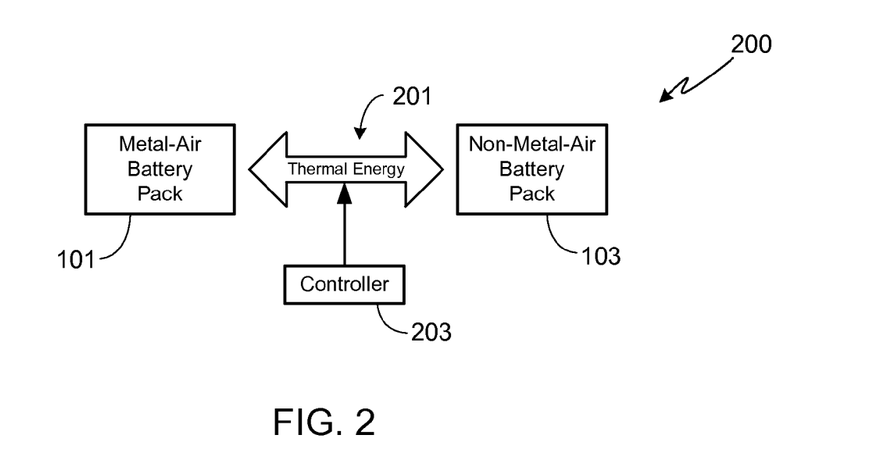
FIG. 2 illustrates the basic methodology of the invention.

In general, and as illustrated in FIG. 2, during charging thermal energy 201 is allowed, in a controlled fashion, to pass between the metal-air battery pack 101 and the conventional battery pack 103. The amount of thermal energy as well as the direction of flow of thermal energy is preferably controlled by a controller 203. Preferably controller 203 also controls the charge rate for each battery pack. Thus, for example, when both battery packs are cold, charging may be limited to the metal-air battery pack and excess thermal energy generated by the metal-air battery pack may be used to heat the non-metal-air, conventional battery pack. Then once the conventional battery pack has been sufficiently heated, charging of the conventional battery pack may be initiated (or the charge rate increased).

Figure 3:
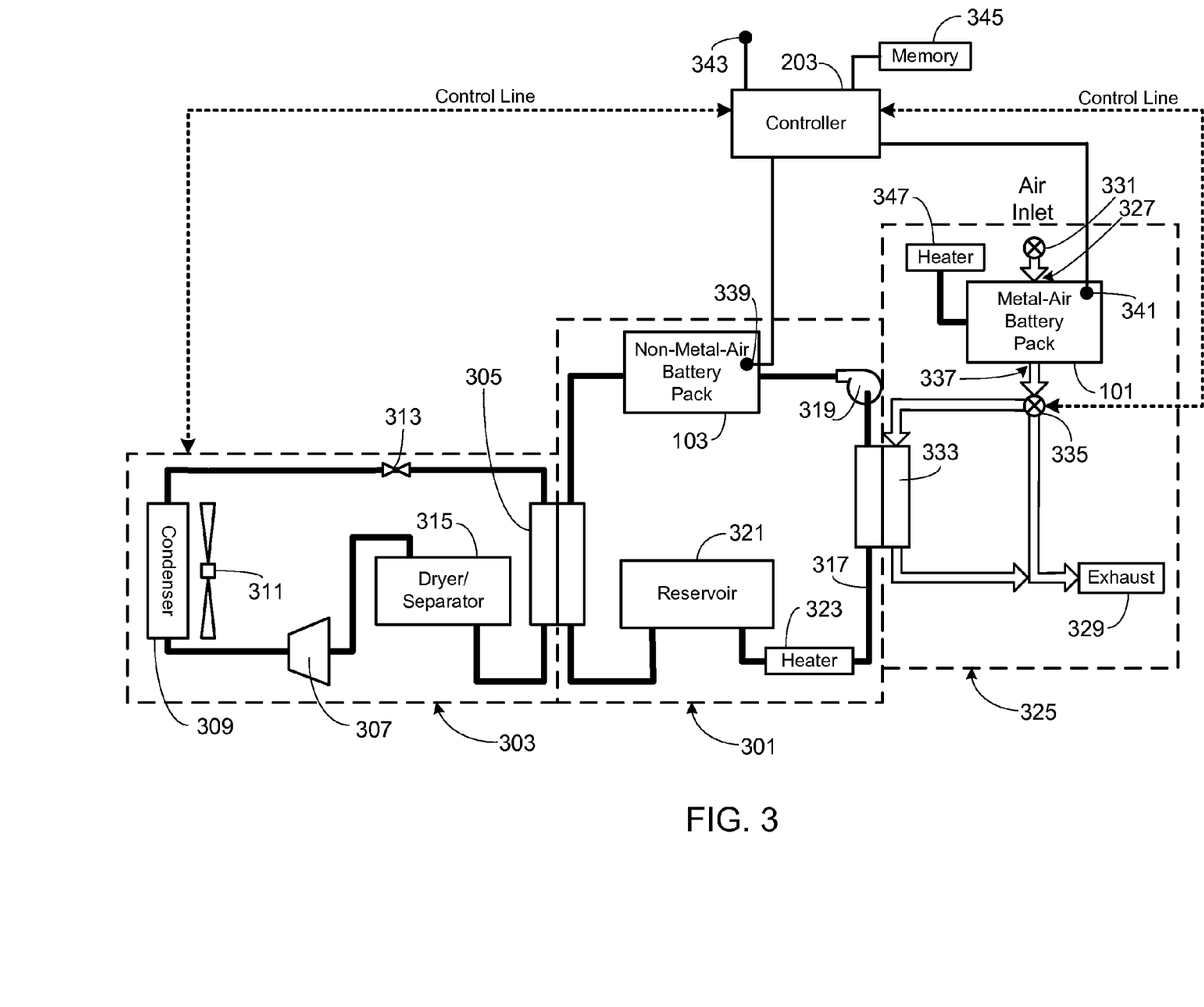
FIG. 3 illustrates a preferred embodiment of the invention.

FIG. 3 illustrates a preferred embodiment of the invention. As shown, a cooling system 301 that corresponds to conventional battery pack 103 is coupled to a refrigeration subsystem 303 via a heat exchanger 305. Refrigeration subsystem 303 may also be utilized by a heating, ventilation and cooling (HVAC) subsystem associated with the EV, as well as to cool other components within the drive and power control system (e.g., power electronics, motor(s), transmission, etc.). As these aspects of the vehicle's thermal management system do not alter the way in which the present invention operates, further discussion of these auxiliary thermal systems is not be provided herein.

It will be appreciated that there are a variety of ways in which a refrigeration subsystem, such as subsystem 303, may be implemented. The illustrated refrigeration subsystem is only meant to illustrate one such technique; other techniques/variations are well known by those of skill in the art. Accordingly, it should be understood that other refrigeration subsystems may be used to cool the conventional battery pack without departing from the scope of the present invention.

In the preferred embodiment, and as illustrated in FIG. 3, refrigeration subsystem 303 is comprised of a compressor 307, condenser 309, fan 311, thermostatic expansion valve 313, dryer/separator 315, and heat exchanger 305. Compressor 307 compresses the low temperature refrigerant vapor in the subsystem into a high temperature vapor. The refrigerant vapor then dissipates a portion of the captured heat when it passes through condenser 309, thereby leading to a phase change from vapor to liquid, the liquid remaining at a high temperature and pressure. Preferably the performance of condenser 309 is enhanced by using a blower fan 311 as shown. The liquid phase refrigerant then passes through thermal expansion valve 313 which lowers both the temperature and pressure of the refrigerant as well as controlling the flow rate of refrigerant into heat exchanger 305. Heat exchanger 305 provides a simple means for transferring heat between the refrigerant contained in subsystem 303 and the coolants contained in battery pack cooling subsystem 101. After being heated in heat exchanger 305, the refrigerant is separated into the liquid and vapor phases by dryer/separator 315, thus insuring that only vapor passes through compressor 307. It should be appreciated that although refrigeration subsystem 303 is preferred, the invention can utilize other refrigeration subsystem configurations as previously noted. Regardless of the refrigeration subsystem configuration used, it includes a heat exchanger which can be used cooperatively with the battery cooling subsystem as described herein.

In battery pack cooling subsystem 301 a coolant, i.e., a heat transfer medium, that is in thermal contact with conventional battery pack 103 is used to control the battery pack's temperature. Preferably the coolant is a liquid and is thermally coupled to battery pack 103 via a heat transfer plate or coolant conduits that are integrated into the battery pack. In a preferred embodiment, the coolant is pumped through a coolant loop 317 by circulation pump 319, loop 317 being coupled to the battery pack. As the coolant circulates through coolant loop 317, thermal energy is transferred to or from conventional battery pack 103, preferably using one or more heat exchangers that are coupled to coolant loop 317 and various heating/cooling sources. For example, in the illustrated embodiment coolant loop 317 is coupled to refrigeration subsystem 303 via heat exchanger 305, thus allowing heat to be withdrawn from battery pack 103 and cooled via heat transfer with the refrigeration subsystem that is also coupled to heat exchanger 305. Preferably the battery cooling subsystem 301 also includes a coolant reservoir 321. While cooling loop 317 may also be thermally coupled to a heater 323 (e.g., a PTC heater), typically the temperature of the conventional battery pack 103 may be maintained within its preferred operating range using only refrigeration subsystem 303 and the heat generated by the metal-air battery pack 101 as described below.

It will be appreciated that there are numerous ways of controlling the amount of cooling supplied by refrigeration subsystem 303 to battery pack cooling subsystem 301. One approach is through the use of valves, for example a valve within coolant loop 317 can be used to control the flow of coolant through the cooling subsystem 301 and thus the level of cooling achieved via heat exchanger 305. Alternately, by varying the speed of coolant circulation pump 319, the degree of cooling can be varied. Alternately, bypass valves may be used to control the amount of coolant that flows through heat exchanger 305. Alternately, the amount of cooling supplied to heat exchanger 305 by the refrigeration cooling subsystem 303 may be controlled.

Metal-air battery pack 101 is included within a second battery pack subsystem 325. Subsystem 325 includes both an air inlet 327, required to supply air to the metal-air cells during the discharge cycle, and an air outlet 329, required to allow the oxygen emitted by the cells during charging to be exhausted out of the battery pack. Typically outlet 329 directs the flow outside of the EV. It will be appreciated that as the reaction within the metal-air cells requires oxygen to proceed, in some embodiments subsystem 325 includes a valve 331 corresponding to air inlet 327, thus providing a simple means of controlling the reaction rate of the cells within battery pack 101. In some embodiments the same duct is used both as the air inlet 327 and the air outlet 329.

Battery pack subsystem 325 is coupled to battery pack subsystem 301 via a heat exchanger 333. Heat exchanger 333 is coupled via valve 335 and suitable ducting to the air outlet 337 of metal-air battery pack 101, valve 335 controlling the flow of air passing through battery pack 101 that is coupled to heat exchanger 333 and/or coupled to air outlet 329. Heat exchanger 333 is coupled to the conventional battery pack subsystem 301 by coolant loop 317.

In one embodiment of the invention, controller 203 controls the flow of air from the metal-air battery pack 101 to heat exchanger 333 using valve 335, thus controlling the amount of metal-air pack generated thermal energy that is used to heat the conventional cells, for example lithium-ion cells, in battery pack 103. One or more temperature sensors are used to communicate the temperature of battery packs 101 and 103 to controller 203. For example, in the preferred embodiment at least one temperature sensor 339 monitors the temperature of conventional battery pack 103 and at least one temperature sensor 341 monitors the temperature of metal-air battery pack 101. Preferably at least one temperature sensor 343 monitors the ambient air temperature and communicates that information to controller 203. Sensors 339, 341 and 343 may use any of a variety of temperature sensing elements, e.g., thermocouples, thermisters, resistance temperature detectors (RTDs), etc. Although FIG. 3 only shows a single representative sensor for each battery pack, it should be understood that multiple temperature sensors are preferably located throughout each battery pack, thereby allowing the average temperature of the battery packs to be determined as well as temperature gradients throughout the packs. Also coupled to controller 203 is memory 345 (e.g., EPROM, EEPROM, flash memory, RAM, a solid state disk drive, a hard disk drive, or any other memory type or combination of memory types) that stores the desired operating parameters of the battery packs as well as the process instructions.

Figure 4:
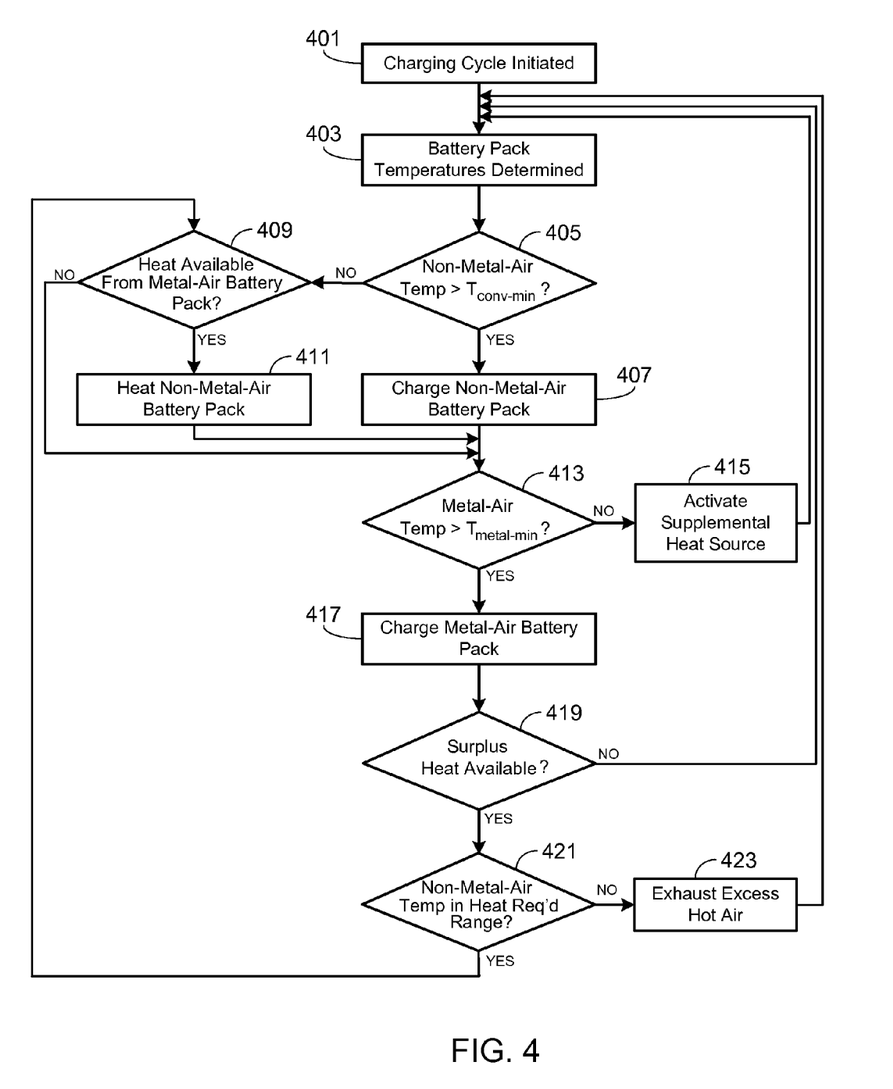
FIG. 4 illustrates a preferred methodology for use with the apparatus illustrated in FIG. 3.

FIG. 4 illustrates the methodology applied in one embodiment of the invention. While thermal energy from metal-air battery pack 101 may be used at any time to provide heat to conventional battery pack 103, typically it is only required when the battery packs are cold. Accordingly, in the exemplary process shown in FIG. 4, the process starts when the charging cycle is first initiated (step 401). It will be understood, however, that heat may be supplied from the metal-air battery pack to the conventional battery pack at any time it is required to achieve an optimal operating temperature.

After process initiation, the temperature of the battery packs is determined (step 403) using sensors 339/341. While the temperature requirements of the two battery packs will depend upon the specific chemistries of the cells selected for each battery pack, in general the minimum temperature requirements of the conventional battery pack are higher than those of the metal-air battery pack. In step 405 the temperature of conventional battery pack 103 is compared to a target temperature. In a preferred embodiment, the target temperature is the minimum temperature, $T_{conv-min}$, at which charging is allowed. In one embodiment $T_{conv-min}$ is equal to 20° C. If the temperature of conventional battery pack 103 is greater than the target temperature (e.g., $T_{conv-min}$), charging of the conventional battery pack is started (step 407). If the temperature of conventional battery pack 103 is less than the target temperature, then controller 203 determines if thermal energy is available from metal-air battery pack 101 (step 409). If thermal energy is available from metal-air battery pack 101, then controller 203 causes heat to be transferred to the conventional battery pack (step 411), for example by opening valve 335 so that heat can be transferred via heat exchanger 333 and insuring that coolant is being pumped through coolant loop 317, battery pack 103 and heat exchanger 333.

At step 413, the temperature of metal-air battery pack 101 is compared to its target temperature. In a preferred embodiment, the metal-air target temperature is the minimum temperature, $T_{metal-min}$, at which charging is allowed. In one embodiment $T_{metal-min}$ is equal to 0° C. As previously noted, typically $T_{metal-min}$ is less than $T_{conv-min}$ due to the different chemistries employed by the two types of cells. If the temperature of metal-air battery pack 101 is less than its corresponding target temperature, then preferably controller 203 activates a supplemental battery pack heating system (step 415). The supplemental heating system may be comprised, for example, of a heater 347 (e.g., PTC heater) coupled to the metal-air battery pack. If the temperature of metal-air battery pack 101 is greater than its corresponding target temperature, charging of the metal-air cells is started (step 417).

At step 419, controller 203 determines if the metal-air battery pack has warmed up to a sufficient degree to allow heat to be transferred to conventional battery pack 103. In at least one embodiment, a small amount of heat is always passed to heat exchanger 333. In at least one alternate embodiment, a small amount of heat is passed to heat exchanger 333 only if the metal-air battery pack temperature is greater than a second preset temperature, $T_{metal-min2}$. Limiting the transfer of thermal energy out of the metal-air battery pack insures that the metal-air batteries quickly increase temperature to a temperature that allows more efficient charging. Once the temperature of metal-air battery pack 101 exceeds a third preset temperature, $T_{metal-min3}$, controller 203 passes a much larger amount of thermal energy to the conventional battery pack via valve 335 and heat exchanger 333. In one embodiment $T_{metal-min3}$ is equal to 50° C.

If thermal energy is available from metal-air battery pack 101, then controller 203 determines whether the conventional battery pack requires heating, or if it is already in the desired temperature range (step 421). If excess thermal energy is available from the metal-air battery pack and the conventional batteries need to be heated, then controller 203 allows heat to be transferred to the conventional battery pack as previously noted (see steps 409/411). If excess thermal energy is available but the conventional batteries do not need further heating, then controller 203 exhausts the excess hot air (step 423).

In the embodiment described above, metal-air battery pack 101 has a lower allowed charging temperature than the conventional battery pack. As a result, when the temperature of the cells is low, i.e., lower than the allowed charging temperature of the conventional cells, the metal-air cells begin charging first. Then as the temperature of the metal-air battery pack increases, excess thermal energy is transferred to the conventional battery pack, thus increasing the temperature of the conventional cells. Once the temperature of the conventional cells has been raised sufficiently, charging of the conventional cells is allowed to commence.

In at least one preferred embodiment of the invention, controller 203 modulates the flow of thermal energy between the metal-air battery pack and the conventional battery pack, as well as modulating the flow of thermal energy out of exhaust 329, thereby optimizing the temperature of each of the battery packs. Preferably controller 203 also controls refrigeration subsystem 303 and the cooling subsystem 301, thus allowing further optimization of the temperature of both battery packs 101 and 103. It will be appreciated, and as previously noted, this control may extend beyond the charging cycle and also be used to optimize the battery pack temperatures during the discharge cycle.

Figure 5:
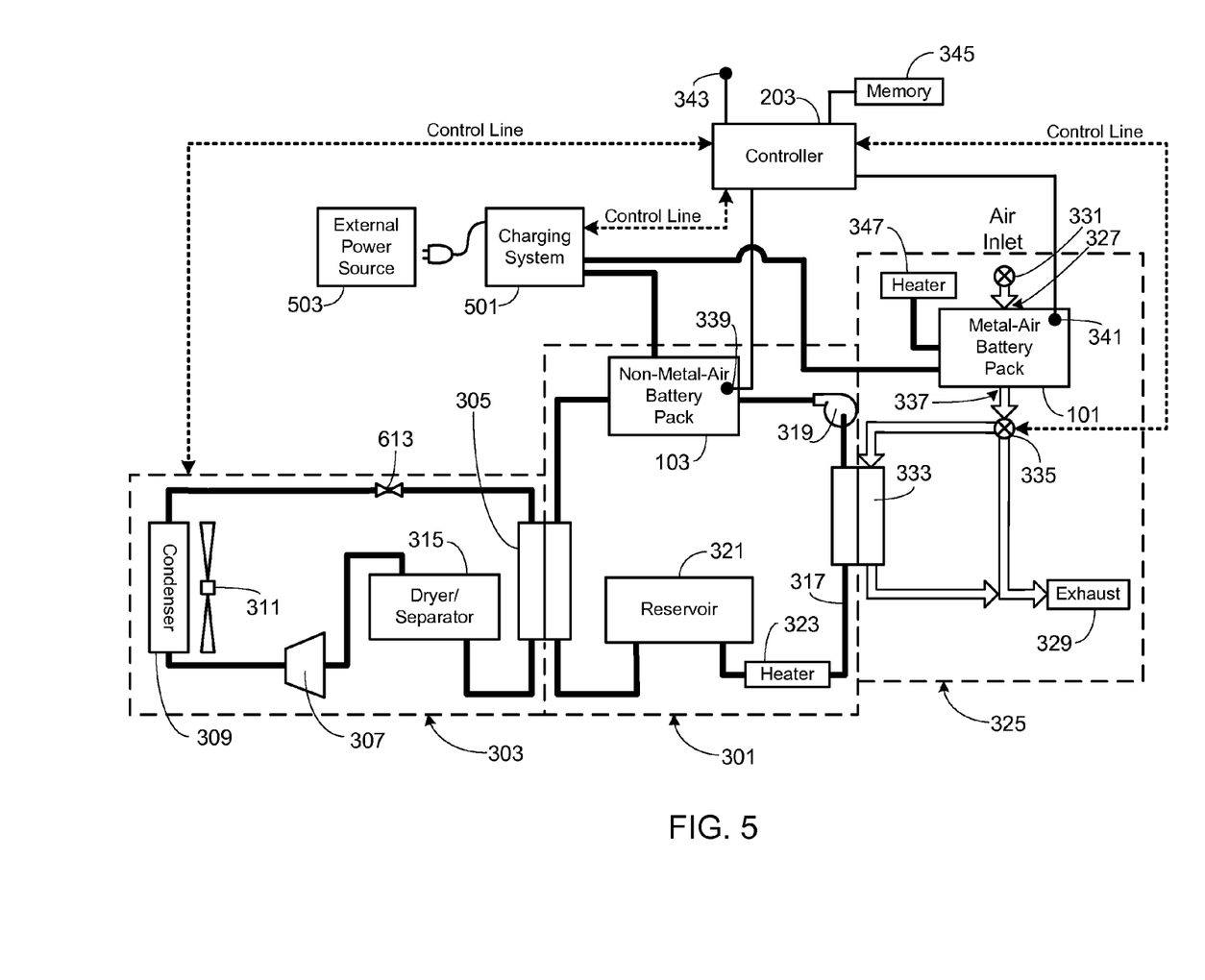
FIG. 5 illustrates a variation of the system shown in FIG. 3.

FIG. 5 illustrates a modification of the system shown in FIG. 3. In this embodiment, controller 203 is also coupled to, and provides control over, charging system 501. Preferably charging system 501 controls the charging parameters (e.g., charge rate, cut-off voltage, etc.) applied during the charging of metal-air battery pack 101 and conventional battery pack 103 as well as monitoring their state-of-charge (SOC). Charging system 501 is preferably integrated within EV 100. Alternately, in at least one embodiment the portion of the charging system that converts external power to a power level (e.g., voltage) that is compatible with the battery packs is external to the vehicle while a second portion of the charging system that controls charging characteristics such as cut-off voltage, charging rate, etc. is internal to the vehicle. Alternately, the entire charging system may be external to EV 100.

In at least one preferred embodiment, charging system 501 is configured to be plugged into, or otherwise connected to, an external power source 503. A municipal power grid is one example of an external power source 503. Charging system 501 insures that the power from source 503 is converted to a form of power storable by battery packs 101 and 103. For example, charging system 501 typically includes an AC to DC rectifier in order to convert power from the power source to that required by the batteries. It will be appreciated that in some embodiments the battery packs may be charged in whole or in part by an on-board power generator, which is coupled to the battery packs via charging system 501. In at least one preferred embodiment, external power source 503 is preferred for providing a full charge to batteries while the on-board power generator (e.g., regenerative braking system) is used only to augment the charge within the battery packs.

Figure 6:
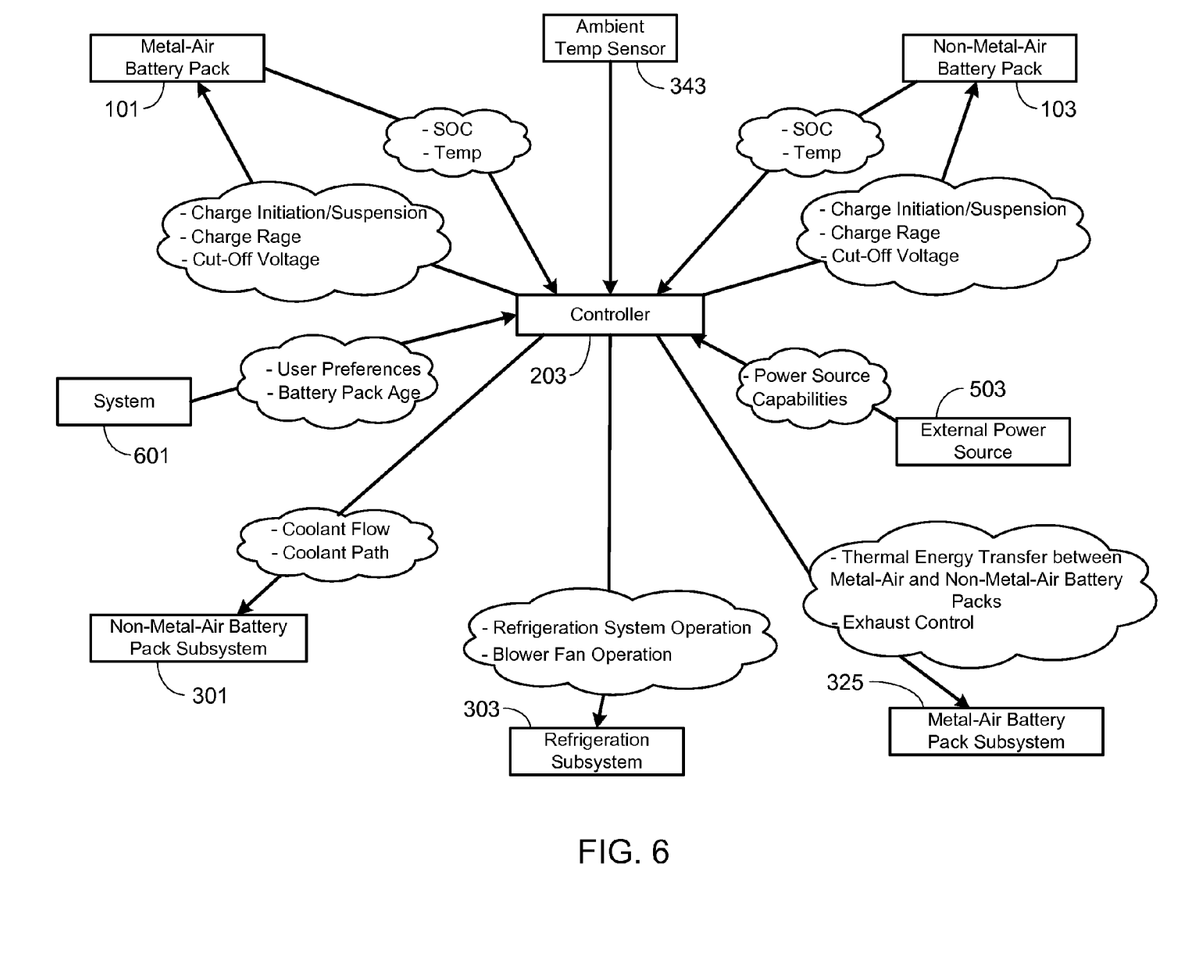
FIG. 6 illustrates the overall flow of the system that allows battery pack charge optimization to be accomplished.

In a preferred embodiment of the invention, controller 203 is used to optimize the charging of both battery packs, i.e., metal-air battery pack 101 and non-metal-air battery pack 103. In particular, and as illustrated in FIG. 6, controller 203 obtains input from each of the battery packs 101 and 103 (e.g., SOC and battery pack temperature), from the ambient temperature sensor, and from the external power source 503 (e.g., power source capabilities). Other data, such as battery pack age and user driving preferences (e.g., long range, high performance), may also be provided to controller 203, for example from the EV's operating system 601. Controller 203 uses this information to control the charging of both battery packs via charger 501, and to control the temperature of each of the battery packs via control of refrigeration subsystem 303, conventional battery pack cooling subsystem 301, and metal-air battery pack airflow subsystem 325.

It should be understood that while the preferred technique for transferring thermal energy from the metal-air battery pack to the conventional battery pack is illustrated and described above, other techniques may also be used. For example, rather than passing the heated air through heat exchanger 333, the heated air could be forced to pass directly through conventional battery pack 103, thereby directly heating the cells.

While both the metal-air battery pack 101 and the conventional battery pack 103 are shown and described as singular packs, it should be understood that one or both of these packs may be comprised of multiple modules, and that the present invention is equally applicable to such a configuration. The use of multiple modules (or mini-battery packs) may be useful in distributing weight throughout EV 100, or to fit into the physical constraints of the EV's chassis/body, and does not impact the present invention.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:
1. A power source, comprising:
a first battery pack comprising a plurality of metal-air batteries;
a second battery pack comprising a plurality of non-metal-air batteries; and
a thermal energy transfer system coupled to said first and second battery packs, wherein said thermal energy transfer system is configured to operate in at least a first mode and a second mode, wherein in said first mode said thermal energy transfer system transfers thermal energy generated by said first battery pack to said second battery pack for heating said second battery pack, and wherein in said second mode said thermal energy transfer system reduces the thermal energy transferred from said first battery pack to said second battery pack, said thermal energy transfer system comprising:
a first battery pack subsystem comprised of an air inlet coupled to said first battery pack, an air outlet coupled to said first battery pack, at least one valve for controlling air flow from said air outlet, and an exhaust coupled to said at least one valve for exhausting air from said first battery pack;

a second battery pack cooling system comprised of a coolant within a coolant loop, said coolant loop in thermal communication with said second battery pack; and a heat exchanger in thermal communication with said coolant loop and in thermal communication with an air duct, said air duct coupled to said air outlet, wherein said at least one valve controls flow from said air outlet to said heat exchanger via said air duct.

2. The power source of claim 1, wherein in said second mode said thermal energy transfer system terminates the transfer of thermal energy from said first battery pack to said second battery pack.

3. The power source of claim 1, wherein said non-metal-air batteries are selected from the group consisting of lithium ion cells, lithium ion polymer cells, nickel metal hydride cells, nickel cadmium cells, nickel hydrogen cells, nickel zinc cells, and silver zinc cells.

4. The power source of claim 1, further comprising:
a controller coupled to said thermal energy transfer system;
at least one temperature sensor corresponding to said first battery pack and monitoring a first battery pack temperature, wherein said at least one temperature sensor corresponding to said first battery pack outputs a signal representative of said first battery pack temperature to said controller;
at least one temperature sensor corresponding to said second battery pack and monitoring a second battery pack temperature, wherein said at least one temperature sensor corresponding to said second battery pack outputs a signal representative of said second battery pack temperature to said controller; and
wherein said controller causes said thermal energy transfer system to operate in said first mode when said second battery pack temperature is less than a first preset temperature and in said second mode when said second battery pack temperature is greater than a second preset temperature.

5. The power source of claim 4, wherein said first and second preset temperatures are the same temperature.

6. The power source of claim 4, wherein said controller causes said thermal energy transfer system to operate in said first mode when said second battery pack temperature is less than said first preset temperature and said first battery pack temperature is greater than a third preset temperature.

7. The power source of claim 4, further comprising a battery pack charging system coupleable to said first and second battery packs and to an external power source, wherein said battery pack charging system charges said first and second battery packs in accordance with battery pack charging commands set by said controller, wherein said battery pack charging commands include initiation of first battery pack charging, wherein said battery pack charging commands include suspension of first battery pack charging, wherein said battery pack charging commands include initiation of second battery pack charging, wherein said battery pack charging commands include suspension of second battery pack charging, and wherein said controller sets said battery pack charging commands based on at least said second battery pack temperature.

8. The power source of claim 7, wherein said controller sets said battery pack charging commands based on at least said first and second battery pack temperatures.

9. The power source of claim 7, wherein said battery pack charging commands set by said controller further include a plurality of charge rates applicable to said first and second battery packs during charging.

10. The power source of claim 9, wherein said controller sets said battery pack charging commands based on at least said first and second battery pack temperatures.

11. The power source of claim 7, further comprising a state-of-charge (SOC) detection system, wherein said SOC detection system monitors SOC for said first and second battery packs, wherein said controller terminates charging of said first battery pack when said SOC for said first battery pack reaches a first target SOC level, and wherein said controller terminates charging of said second battery pack when said SOC for said second battery pack reaches a second target SOC level.

12. The power source of claim 7, wherein in said first mode first battery pack charging is initiated and second battery pack charging is not initiated, and wherein in said second mode second battery pack charging is initiated.

13. The power source of claim 1, further comprising:
a refrigeration subsystem independent of said second battery pack cooling system; and
a second heat exchanger in thermal communication with said refrigeration subsystem and in thermal communication with said second battery pack cooling system via said coolant loop.

* * * * *